United States Patent
Cheng et al.

[19]

[11] Patent Number: 5,884,523

[45] Date of Patent: Mar. 23, 1999

[54] SCOOP WITH A COUNTER

[76] Inventors: Jung-kuang Cheng; Chi-hung Cheng, both of 242 Chung-Yang Rd. Sec. 2, Tu-Cheng City, Taipei Hsien, Taiwan

[21] Appl. No.: 120,305

[22] Filed: Jul. 22, 1998

[51] Int. Cl.$^6$ .................................................. G02F 19/00
[52] U.S. Cl. ................................................................ 73/426
[58] Field of Search .................................. 141/108, 280; 33/501.45; 222/36; 73/426–429; 30/326; 116/200, 280, 284, 298, 303

[56] References Cited

U.S. PATENT DOCUMENTS

| | | | |
|---|---|---|---|
| 464,393 | 12/1891 | Scheid | 73/426 |
| 1,249,017 | 12/1917 | Brunkhurst | 73/426 |
| 2,042,945 | 6/1936 | Lemay | 73/426 |
| 2,259,504 | 10/1941 | Wilson et al. | 73/426 |
| 2,459,466 | 1/1949 | Spreen | 73/426 |
| 4,283,951 | 8/1981 | Varpio | 73/426 |
| 4,981,041 | 1/1991 | Merkle | 73/426 |
| 5,448,913 | 9/1995 | Robbins et al. | 73/426 X |
| 5,678,450 | 10/1997 | Robbins et al. | 73/426 X |
| 5,706,974 | 1/1998 | Murdick et al. | 73/426 X |

*Primary Examiner*—Elizabeth L. Dougherty
*Attorney, Agent, or Firm*—Jacobson, Price, Holman & Stern, PLLC

[57] ABSTRACT

A scoop with a counter for powder material includes a scooping cup with a handle and a pusher that can slide to and fro on the handle of the scoop. On the front end of the pusher is a cover ring and on the rear end of the pusher is a top plate. At the end of the handle of the scooping cup is fitted a housing that is composed of a left casing and a right casing. On each casing there is a window and inside the casings is fitted a counter ratchet. A digit frame in a ring arrangement is attached to both sides of the counter ratchet. On the lower part of the housing is an opening so a toothed side of the counter ratchet is exposed to facilitate resetting adjustment. Also in the housing and at the toothed side of the counter ratchet is a flexible fixing plate to fix the counter ratchet. In operation, the pusher may be slid across the scooping cup where the cover ring at the front end of the pusher will level the powder material in the scooping cup to obtain a constant quantity of powder material. When the pusher is slid back, the top plate at the rear of the pusher will push and turn the counter ratchet which will then turn the next digit of the digit frame to count scooping frequency.

1 Claim, 4 Drawing Sheets

SCOOP WITH A COUNTER

BACKGROUND OF THE INVENTION

A "scoop with a counter", particularly one with the installation of a pusher and a counter ratchet, to level the scooped powder material while the number of scoops can be counted.

As recommended by modern physicians, a new-born baby should be breast-fed by its mother. But nowadays most pregnant women are of the working class who must return to their working positions after the baby is born, so they could not breast-feed the baby. As a result, most babies are fed with powdered milk.

To feed a new-born baby, a constant amount of milk powder is formulated for a baby in a certain growth stage; in case the amount of milk powder is insufficient, the diluted milk will cause constipation to the baby; conversely, in case of excessive milk powder, the denser milk will cause indigestion and diarrhea to the baby, therefore, a constant amount of milk powder must be measured; to measure the milk powder, a scoop enclosed with the package of milk powder container is generally used for such a purpose, meanwhile, the excessive milk powder on the scoop cup is generally leveled by a plate or the like to remove the excess of milk powder, thus, it is not so convenient in the scooping process.

To make milk from milk powder, a mother would be running here and there with her hands full, in many cases, she may forget the number of scoops she has already scooped; and as explained above, one scoop more or less will cause indigestion to the baby, so in case the mother forgets the number of scoops of milk powder, she may have to pour back the milk powder already scooped, before she restart the scooping process and the counting.

In view of the inconvenience in removing excessive milk powder from a conventional scooping cup by means of a plate or the like; and the inconvenience of having to pour back the milk powder already scooped and restart the counting in case one has forgotten the number of scoops, the inventor has devoted in the research and has finally come up with a scoop with a counter, comprising mainly a pusher that may slide to and fro on a handle of a scooping cup, on the front end of said pusher is a cover ring, and on the rear end of the pusher is a top plate; at the end of the handle of the scooping cup is fitted a housing that is composed of a left casing and a right casing, on said left casing and right casing is a window, inside the left casing and right casing is a counter ratchet, on its two sides is a digit frame in a ring arrangement, the digit frame on the counter ratchet is visible from the window, and on the lower part of the housing is an opening, so the toothed side of the counter ratchet is exposes to facilitate resetting adjustment, and in the housing at the toothed side of the counter ratchet is a flexible fixing plate to fix the counter ratchet; in the above configuration, the pusher may be pushed forward, when the cover ring at the front end of the pusher will level the milk powder in the scooping cup, thus enabling the measurement of a constant amount of milk powder, and it may be pushed backward, when the top plate at the rear end of the pusher will push and turn the counter ratchet, so the counter ratchet will turn to the next digit, and the number of scooping can be measured.

SUMMARY OF THE INVENTION

The primary objective of the present invention is to present a scoop with the installation of a pusher and a counter ratchet, for the purpose of leveling the excessive milk powder from the scoop, to obtain a constant amount of scooped powder material, while the number of scoops can be counted.

To enable better understanding of the invention, the drawings are described below.

DETAILED DESCRIPTION OF PREFERRED EMBODIMENT

Figure 1:
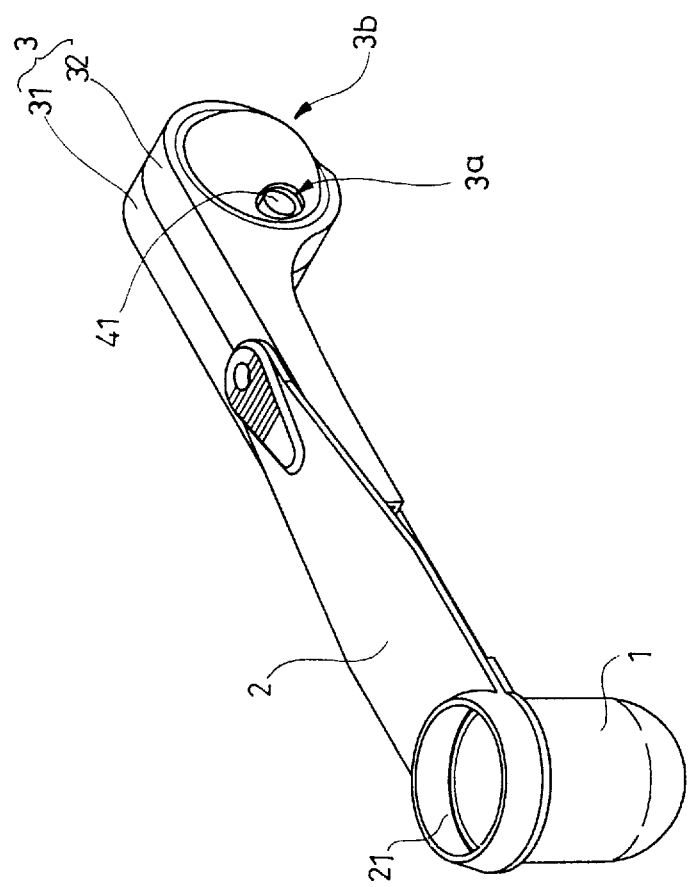
FIG. 1 is a perspective assembled view of the invention.
Figure 2:
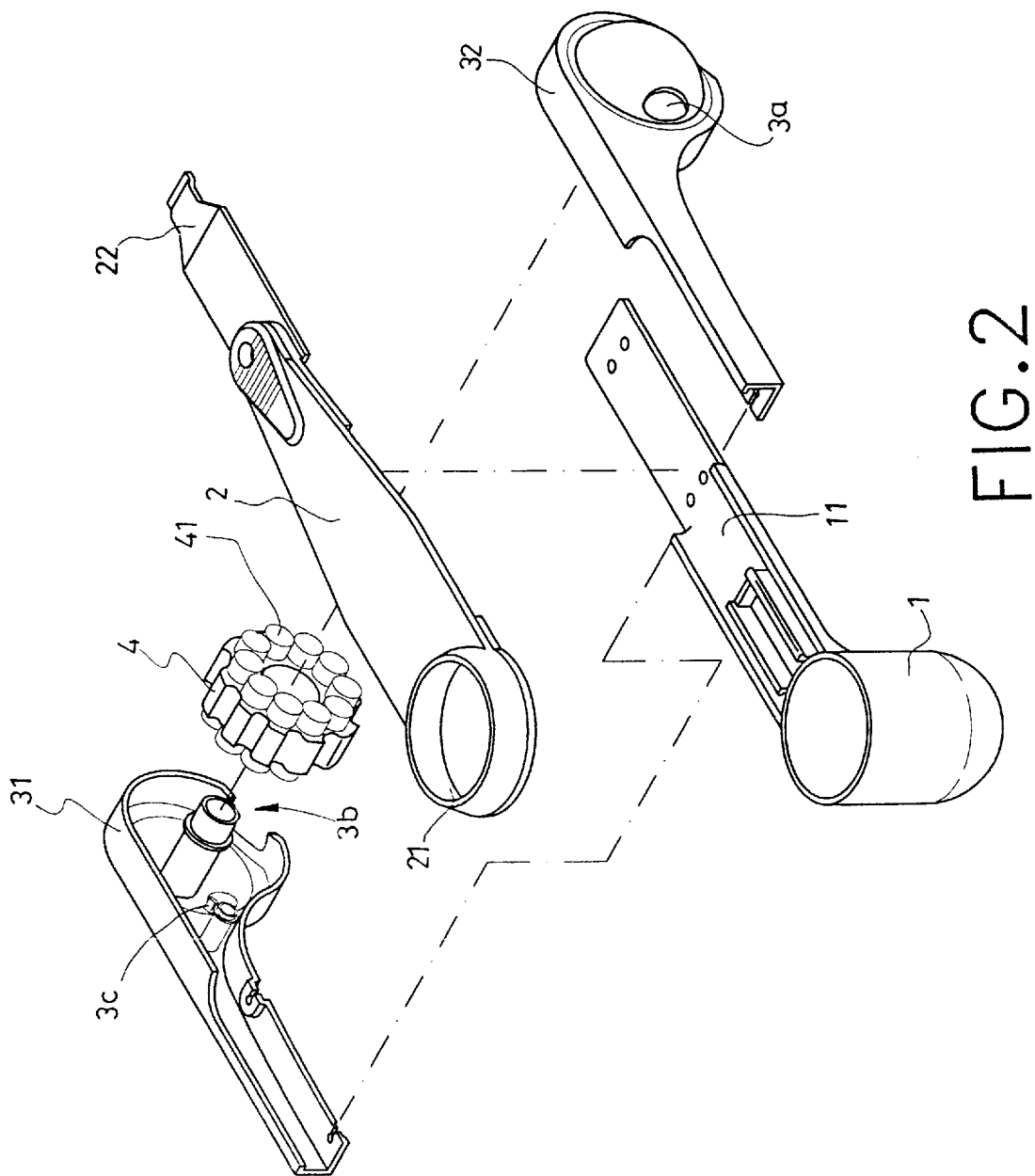
FIG. 2 is an exploded view of the invention.

First, please refer to FIGS. 1 and 2, the invention involves mainly a pusher 2 that can slide to-and-fro on the handle 11 of a scooping cup 1, on the front end of said pusher 2 is a cover ring 21, and on the rear end of the pusher 2 is a top plate 22; on the end of the handle 11 of the scooping cup 1 is a housing 3 that is composed of a left casing 31 and a light casing 32, on said left casing 31 and said right casing 32 is respectively a window 3a, inside the left casing 31 and the right casing 32 is fitted a counter ratchet 4, on its two sides in a ring arrangement is a digit frame 41, the digit frame 41 on the counter ratchet 4 is visible from the window 3a, and on the lower part of the housing 3 is an opening 3b, so the toothed side of the counter ratchet 4 is exposed, and inside the housing 3 and located at the toothed side of the counter ratchet 4 is a flexible fixing plate 3c.

Figure 3:
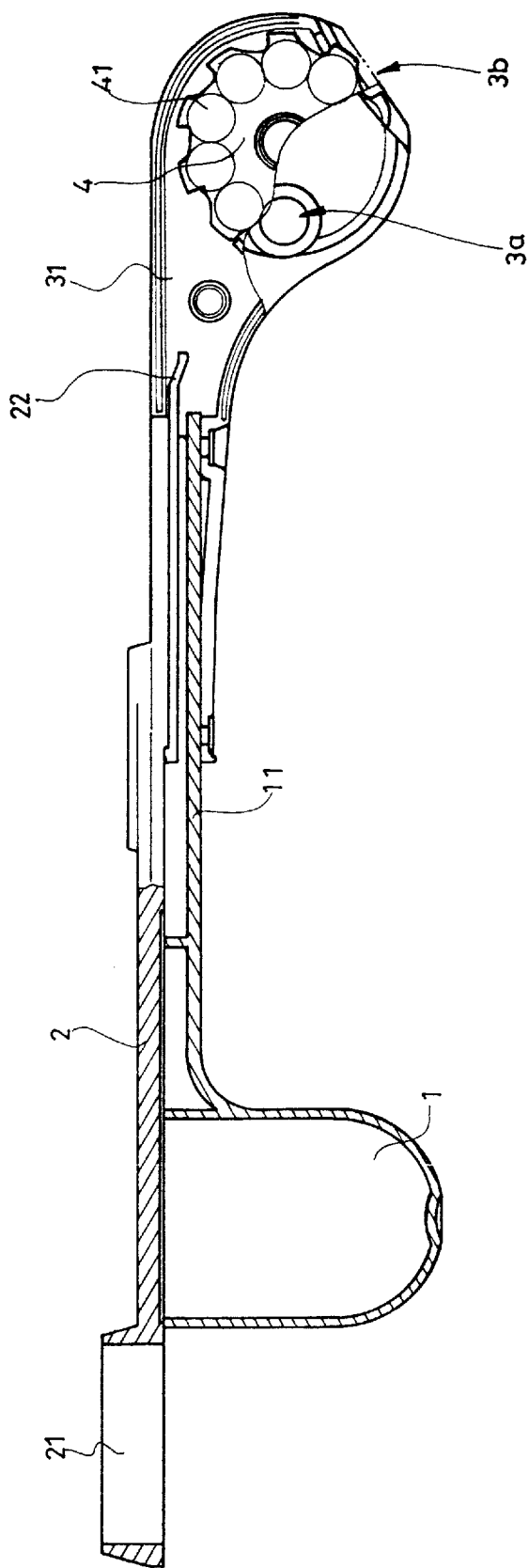
FIG. 3 is an embodiment view of the invention (1).

By said configuration, the counter ratchet 4 can be rotated manually from the opening 3b on the housing 3, to reset the counter ratchet to zero, while the flexible fixing plate 3c inside the housing 3 serves to fix the counter ratchet 4, to the extent that the digit frame 41 will be fixed in one notch each time it is turned, instead of rotating randomly After the counter ratchet 4 is reset, the scoop can be used to take up milk powder, then, the pusher 2 can be pushed forward to remove excessive powder heaping on the scooping cup, then cover ring 21 on the front end ofthe pusher 2 will level the powder on the scooping cup 1, as shown in FIG. 3, therefore, a constant amount of milk powder may be obtained without having to remove the excessive milk powder with a plate or the like.

Figure 4:
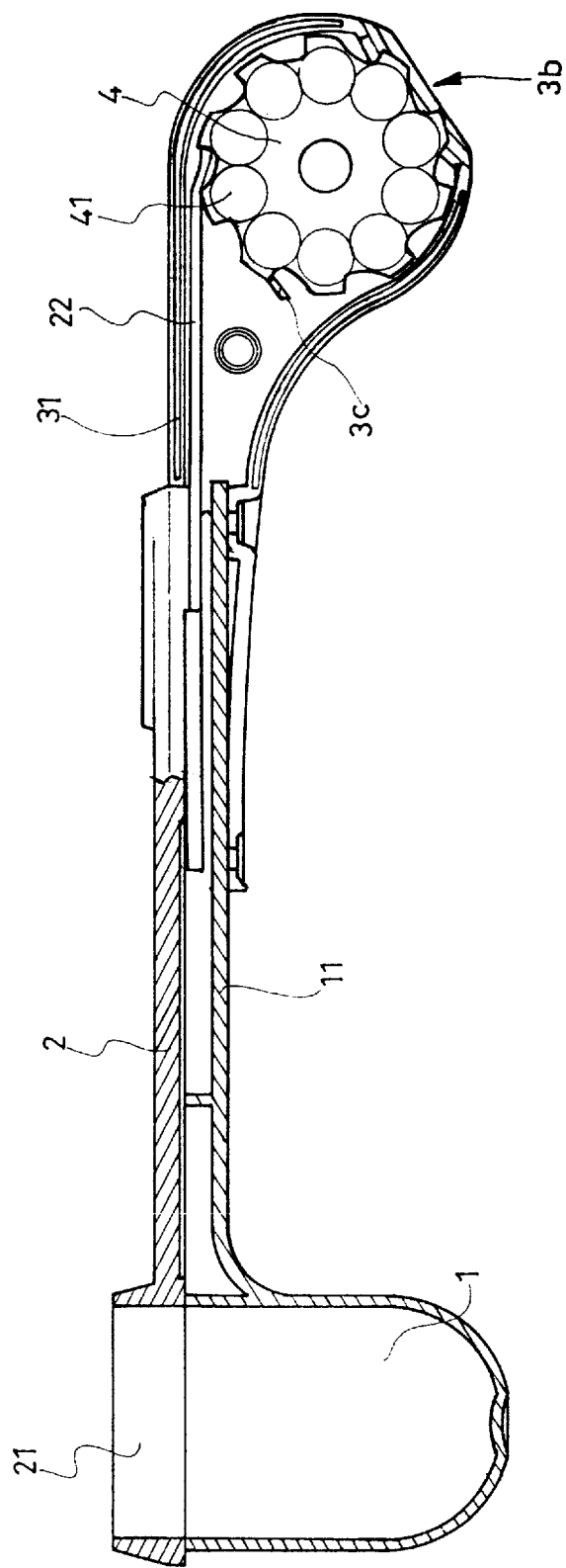
FIG. 4 is an embodiment view of the invention (2).

Furthermore, aft the milk powder is leveled, the pusher 2 is pushed back to the effect that the top plate 22 at the rear end of the pusher 2 will push the counter ratchet 4, so the counter ratchet 4 turns to the next digit frame 41, therefore the frequency of the milk powder already scooped can be measured, as shown in FIG. 4; when the pusher 2 is pushed back to count the frequency after it has leveled the milk powder, the cover ring 21 on the front end of the pusher 2 will return to the top of the scooping cup 1, and since said cover ring is a hollow ring shape, the scooping cup 1 will be reversed, and the milk powder may be emptied out of the hollow in the cover ring 21, thus the milk powder can be scooped and emptied conveniently.

Since on the scooping cup 1 are a pusher 2 that serves to remove excessive milk powder and a counter ratchet 4 that serves to count the scooping frequency, it enables scooping of milk powder while the scooping frequency is counted, in case the user has forgotten the number of scoops already taken, he/she may directly observe the digit. frame 41 displayed on the counter ratchet 4, to know the exact number of scoop, thus avoiding the trouble of having to pour back the milk powder already scooped and restart the counting, and avoiding unnecessary waste of milk powder.

Besides the purpose of measuring milk powder, the invention can also be used for measuring other powdered or granulated foods, and said scooping cup may be designed in various sizes and specifications for applications on various occasions.

We claim:

1. A scoop with a counter for powder material, said scoop comprising a scooping cup with a handle;

a pusher which may be slid from a first side to a second side of said handle of the scooping cup;

a cover ring on a front end of said pusher;

a top plate on a rear end of said pusher;

a housing located at an end of said handle of the scooping cup, which housing is further comprised by a left casing and a right casing;

a window on said left casing and said right casing;

a counter ratchet, having two sides, fitted inside said left casing and said right casing, wherein said two sides each include a digit frame in a ring arrangement, said digit frame on said counter ratchet being visible from said windows;

an opening located on a lower part of the housing so that a toothed side of the counter ratchet is exposed; and a flexible fixing plate adjacent the toothed side of said counter ratchet wherein the pusher may be slid to the first side of the handle of the scooping cup so that the cover ring on the front end of the pusher will level the powder material in the scooping cup and the pusher may then be slid to the second side of the handle by which the top plate at the rear end of the pusher will push and turn the counter ratchet to a next digit frame to count the scooping frequency.

* * * * *